(12) United States Patent
Owens

(10) Patent No.: US 9,267,468 B2
(45) Date of Patent: Feb. 23, 2016

(54) HYDROGEN SUPPLEMENTAL SYSTEM FOR ON-DEMAND HYDROGEN GENERATION FOR INTERNAL COMBUSTION ENGINES

(71) Applicant: HNO GreenFuels, Inc., Temecula, CA (US)

(72) Inventor: Donald Wade Owens, Temecula, CA (US)

( * ) Notice: Subject to any disclaimer, the term of this patent is extended or adjusted under 35 U.S.C. 154(b) by 110 days.

(21) Appl. No.: 14/326,801

(22) Filed: Jul. 9, 2014

(65) Prior Publication Data

US 2014/0311429 A1 Oct. 23, 2014

Related U.S. Application Data

(63) Continuation of application No. 13/844,416, filed on Mar. 15, 2013, now Pat. No. 8,784,619, which is a continuation of application No. 13/224,338, filed on Sep. 2, 2011, now Pat. No. 8,449,754, which is a (Continued)

(51) Int. Cl.
*F02M 25/12* (2006.01)
*C25B 1/06* (2006.01)

(Continued)

(52) U.S. Cl.
CPC ............ *F02M 25/12* (2013.01); *C01B 13/0207* (2013.01); *C25B 1/06* (2013.01); *C25B 9/10* (2013.01); *H01M 8/00* (2013.01);

(Continued)

(58) Field of Classification Search
CPC ............. F02M 25/12; C25B 1/10; C25B 9/10
See application file for complete search history.

(56) References Cited

U.S. PATENT DOCUMENTS 3,252,455 A 5/1966 Marshall
3,433,729 A 3/1969 Mikhailovich et al.

(Continued)

FOREIGN PATENT DOCUMENTS

DE 19504142 8/1995
WO 2009018814 2/2009
WO 2011150322 12/2011

OTHER PUBLICATIONS

J. Russell, et al "Hydrogen Generation by Solid Polymer Electrolyte Water Electrolysis", American Chemical Society, Chicago Symposium 1973, pp. 24-40.

(Continued)

*Primary Examiner* — Nicholas A Smith

(57) ABSTRACT

A portable, on-demand hydrogen generation system is provided for producing hydrogen and injecting the hydrogen as a fuel supplement into the air intake of internal combustion engines, more particularly to vehicles. Hydrogen and oxygen is produced with a fuel cell at low temperatures and pressure from water in a supply tank. The hydrogen and oxygen is passed back thru the supply tank for distribution and water preservation. The gases are kept separate by a divider in the tank and the water level in the tank. In the case of gasoline engines, the hydrogen is directed to the air intake of the engine while the oxygen is vented to the atmosphere. The device is optionally powered by the vehicle battery, a stand alone battery, waste heat of the internal combustion engine or solar energy. The system utilizes a vacuum switch or other engine sensor that permits power to the device and therefore hydrogen production only when the engine is in operation. Therefore, as the hydrogen is produced it is immediately consumed by the engine. No hydrogen is stored on, in or around the vehicle.

10 Claims, 5 Drawing Sheets

Related U.S. Application Data continuation-in-part of application No. 12/790,398, filed on May 28, 2010, now Pat. No. 8,499,722.

(60) Provisional application No. 61/313,919, filed on Mar. 15, 2010.

(51) Int. Cl.
*C25B 9/10* (2006.01)
*C01B 13/02* (2006.01)
*H01M 8/00* (2006.01)

(52) U.S. Cl.
CPC ............... *Y02E 60/366* (2013.01); *Y02E 70/10* (2013.01); *Y02E 70/20* (2013.01); *Y02P 20/129* (2015.11); *Y02P 20/134* (2015.11); *Y02T 10/121* (2013.01); *Y02T 10/16* (2013.01)

(56) References Cited

U.S. PATENT DOCUMENTS

| | | | |
|---|---|---|---|
| 4,025,405 A | 5/1977 | Dotson et al. |
| 4,031,865 A | 6/1977 | Dufour |
| 4,271,793 A | 6/1981 | Valdespino |
| 4,368,696 A | 1/1983 | Reinhardt |
| 5,272,871 A | 12/1993 | Oshima et al. |
| 5,711,865 A | 1/1998 | Caesar |
| 6,033,549 A | 3/2000 | Peinecke et al. |
| 6,257,175 B1 | 7/2001 | Mosher et al. |
| 6,688,120 B2 | 2/2004 | Aoki et al. |
| 7,021,249 B1 | 4/2006 | Christison |
| 7,143,722 B2 | 12/2006 | Ross |
| 7,458,368 B1 | 12/2008 | Huffman |
| 7,552,702 B2 | 6/2009 | Stone |
| 2004/0013918 A1 | 1/2004 | Merida-Donis |
| 2004/0025808 A1 | 2/2004 | Cheng |
| 2004/0203166 A1 | 10/2004 | Sullivan |
| 2005/0229872 A1 | 10/2005 | Lange |
| 2007/0151865 A1 | 7/2007 | Shimko et al. |
| 2007/0205111 A1 | 9/2007 | Bayliss |
| 2007/0209608 A1 | 9/2007 | Rutledge |
| 2007/0259220 A1 | 11/2007 | Redmond |
| 2008/0257751 A1 | 10/2008 | Smola et al. |
| 2009/0188240 A1 | 7/2009 | Suzuki et al. |
| 2009/0283402 A1 | 11/2009 | Osman |
| 2010/0012090 A1 | 1/2010 | Lewis |
| 2010/0183931 A1 | 7/2010 | Hedman |
| 2010/0236921 A1 | 9/2010 | Yang |
| 2010/0275858 A1 | 11/2010 | Jeffs et al. |
| 2011/0048961 A1 | 3/2011 | Smedley |
| 2011/0290201 A1 | 12/2011 | Owens |
| 2012/0055422 A1 | 3/2012 | Owens |
| 2012/0073521 A1 | 3/2012 | Owens |
| 2012/0073522 A1 | 3/2012 | Owens |
| 2012/0073523 A1 | 3/2012 | Owens |
| 2012/0073524 A1 | 3/2012 | Owens |
| 2012/0073525 A1 | 3/2012 | Owens |

OTHER PUBLICATIONS

C. Kim et al, "Hydrogen Production from Water Using Polymer Electrolyte Membrane", American Institute of Chemical Engineers, Nov. 7, 2004.

I. Papagiannakis, "Studying and Improving the Efficiency of Water Electrolysis using a Proton Exchange Membrane", Thesis Submitted to Strathclyde University, 2005.

HYDROGEN SUPPLEMENTAL SYSTEM FOR ON-DEMAND HYDROGEN GENERATION FOR INTERNAL COMBUSTION ENGINES

CROSS-REFERENCES

This is a continuation of U.S. Ser. No. 13/844,416, filed Mar. 15, 2013, now U.S. Pat. No. 8,784,619, which is a continuation of U.S. Ser. No. 13/224,338, filed Sep. 2, 2011, now U.S. Pat. No. 8,449,754 which is a continuation-in-part application of U.S. Ser. No. 12/790,398, filed May 28, 2010, now U.S. Pat. No. 8,499,722, the contents of which are incorporated herein by reference.

BACKGROUND OF THE INVENTION

1. Field of the Invention

The present invention relates to hydrogen generation devices. More particularly, the present invention relates to a hydrogen supplemental system that can be used with internal combustion engines for increased fuel efficiency and reduced carbon emissions.

2. Description of the Related Art

There are a number of devices on the market that create HHO gas, otherwise known as Brown's gas, which is used as a supplement to gasoline and diesel engines. HHO gas consists of two parts hydrogen to one part oxygen. These devices typically comprise an electrolyzer which decomposes water into hydrogen and oxygen. An example is U.S. Pat. No. 4,368,696. These electrolyzers typically use an electrolyte, most notably KOH, Potassium hydroxide, or baking soda. A voltage is placed across the device to produce the HHO gas.

The main problem with most of these devices is that the energy required to produce the hydrogen creates a substantial load on the electrical system of the vehicle. Similar to running the air conditioner in any vehicle, the additional electrical load causes the miles per gallons to be reduced. Even though the hydrogen typically boosts the efficiency and miles per gallon of the vehicle, the additional electrical load on the vehicle to create the hydrogen is usually great enough to minimize or in many cases negate most or all of mileage gains of the vehicle.

Also, most HHO systems produce the hydrogen and oxygen in a combined gas stream. The hydrogen and oxygen gases are not generally separated from each other. In the case of modern gasoline powered vehicles, this extra oxygen is detected by the vehicle's oxygen sensors which communicate this extra oxygen level to an on-board computer, namely and Electronic Control Unit ECU of the vehicle. When the ECU detects this extra oxygen, it is a signal that the engine is running lean and the ECU adds more gasoline to the engine. This also negates most of the fuel efficiency gains.

Furthermore, HHO systems generally use either baking soda or Potassium Hydroxide KOH. KOH is generally preferred over baking soda because of its stability and because it causes less deterioration of stainless steel plates or other plates used in the electrolyzer. However, KOH has to be handled with care because it is caustic, and the crystals can be dangerous if not handled properly. The electrolyte normally has to be inserted into the unit at the proper proportions for optimum operation of the electrolyzer. Extreme care must be taken when using it. It is not the type of product you would generally like to put in the hands of an inexperienced consumer.

Complex installation is another issue with typical HHO systems. Space usually has to be found somewhere in the engine compartment or outside the vehicle. Since all vehicles are different, finding a suitable spot under the hood to install the device in many vehicles is next to impossible. Also, the systems are typically connected into the electrical systems of the vehicles which can cause blown fuses and a host of other problems if not installed properly. Hydrogen is only needed when the vehicle is actually running, not when the ignition is turned on. During the installation, care must be observed to make sure the electrical power is provided to the device only when the engine is running. Otherwise there can be hydrogen accumulation in the air intake. This further complicates the installation of these systems.

SUMMARY OF THE INVENTION

The present invention relates to a portable and compact, on-demand hydrogen supplemental system for producing hydrogen gas and injecting the hydrogen gas into the air intake of internal combustion engines, particularly for vehicles. Hydrogen and oxygen is produced by a fuel cell at low temperatures and pressure from water in a supply tank. The hydrogen gas and oxygen gas is passed back thru the supply tank for distribution and water preservation. The gases are kept separate by a divider in the tank and the water level in the tank. In the case of gasoline engines, the hydrogen gas is directed to the air intake of the engine while the oxygen gas is optionally vented to the atmosphere. The device can be powered by the vehicles alternator, a stand alone battery, waste heat or solar energy. The system utilizes a vacuum switch or other engine sensor that regulates power to the system and therefore hydrogen production for the engine only occurs when the engine is running. Therefore as the hydrogen is produced it is immediately consumed by the engine. No hydrogen is stored on, in or around the vehicle.

BRIEF DESCRIPTION OF THE DRAWINGS

The foregoing and a better understanding of the present invention will become apparent from the following detailed description of example embodiments and the claims when read in connection with the accompanying drawings, all forming a part of the disclosure of this invention. While the foregoing and following written and illustrated disclosure focuses on disclosing example embodiments of the invention, it should be clearly understood that the same is by way of illustration and example only and the invention is not limited thereto, wherein in the following brief description of the drawings:

DETAILED DESCRIPTION OF THE INVENTION

The present invention as will be described in greater detail below provides an apparatus, method and system, particularly, for example, a hydrogen supplemental system used to increase the fuel efficiency and reduce carbon emissions for internal combustion engines. The present invention provides various embodiments as described below. However it should be noted that the present invention is not limited to the embodiments described herein, but could extend to other embodiments as would be known or as would become known to those skilled in the art.

Figure 1:
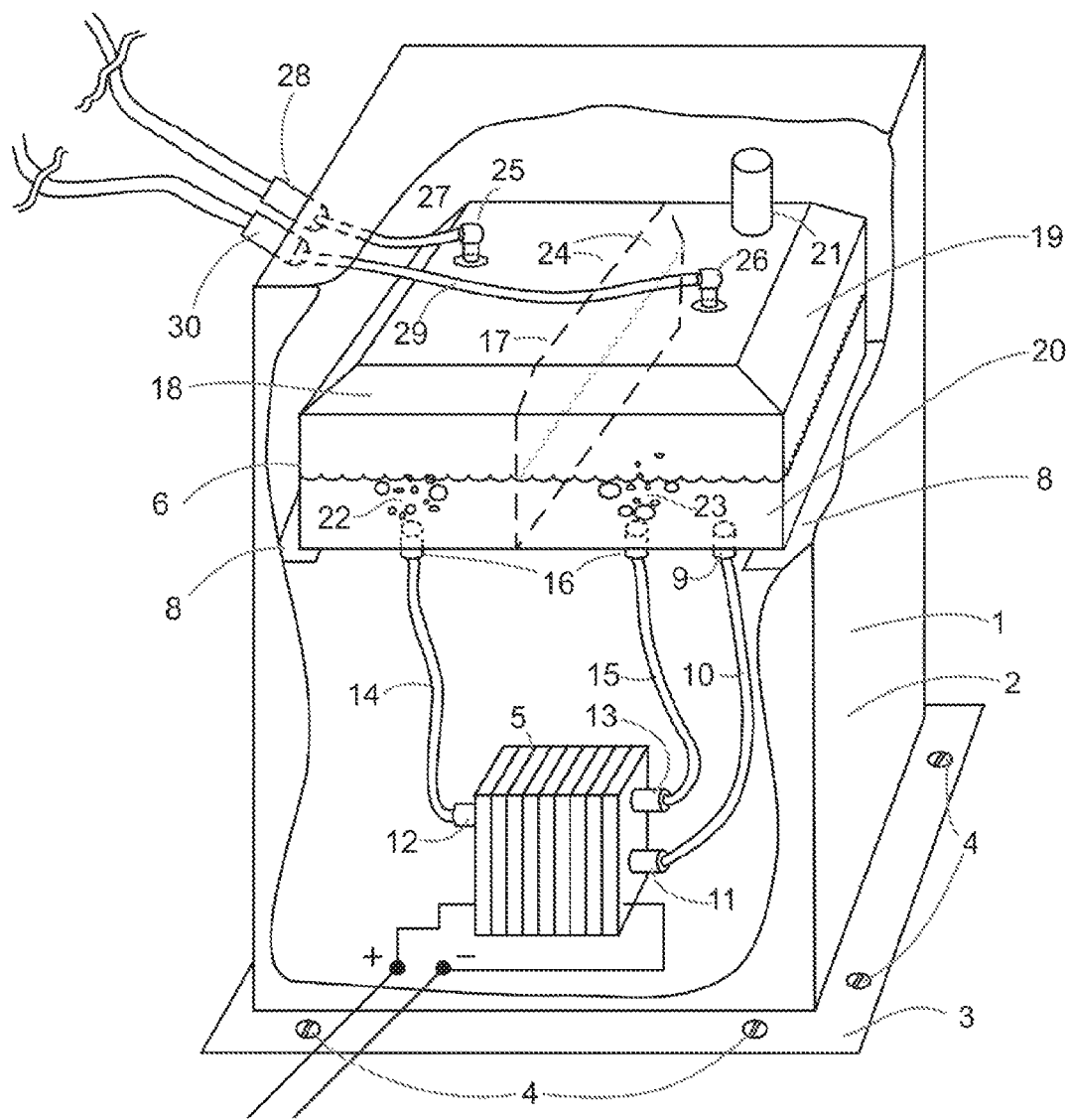
FIG. 1 is a detailed drawing of a portable hydrogen supplemental system showing a water tank and housing design according to the present invention.

The present invention as shown in FIG. 1 provides a portable hydrogen supplemental system 1 which includes a housing unit 2 that can be secured in the trunk or other flat surface of a vehicle by mounting bracket 3 and fastening units 4. Inside the housing unit 2 are a fuel cell 5 and a nonelectrolyte water tank 6 positioned above the fuel cell 5 arranged in such a manner as to supply nonelectrolyte water 7 to the fuel cell 5 by gravity. The nonelectrolyte water tank 6 is supported in the housing unit 2 above the fuel cell 5 by supporting means 8. The housing unit 2 is designed to be readily removable from the mounting bracket 3.

The nonelectrolyte water tank 6 includes a water supply fitting 9 positioned on the underside thereof connected to a tube or other supply means 10 that is in turn connected to water inlet fitting 11 on the fuel cell 5. Nonelectrolyte water 7 is supplied to the fuel cell 5 by the supply means 10. The fuel cell 5 also includes a hydrogen gas outlet fitting 12 and an oxygen gas outlet fitting 13 which are connected by tubes or additional supply means 14 and 15 to gas inlet fittings 16 on the underside of the nonelectrolyte water tank 6. The nonelectrolyte water tank 6 includes at least one divider 17 that divides the tank 6 into at least two sections, a hydrogen section 18 and an oxygen section 19. The divider 17 is formed along the inner wall of the tank 6 and extends to approximately ¼" from the bottom surface 20 of the tank 6. The tank 6 includes a fill spout 21 which permits the tank 6 to be filled with nonelectrolyte water. As nonelectrolyte water 7 is placed into the tank 6, the tank 6 fills evenly on both sides of the divider 17.

The fuel cell 5, which is commonly known to produce electricity, is operated in reverse to produce hydrogen and oxygen gases. Thus, the fuel cell 5 essentially operates as an electrolyzer, which as described above decomposes nonelectrolyte water 7 into hydrogen and oxygen and is hereinafter referred to as an electrolyzer 5. Nonelectrolyte water 7 fills the electrolyzer 5 from the nonelectrolyte water tank 6 and when a voltage, having positive and negative terminals, is placed across the electrolyzer 5, hydrogen and oxygen gases are produced on opposing sides of the electrolyzer 5.

According to the invention the electrolyzer 5 can, for example, be a proton exchange membrane or polymer electrolyte membrane (PEM) electrolyzer. A PEM electrolyzer includes a semipermeable membrane generally made from ionomers and designed to conduct protons while being impermeable to gases such as oxygen or hydrogen. This is their essential function when incorporated into a membrane electrode assembly (MEA) of a proton exchange membrane fuel cell or of a proton exchange membrane electrolyzer: separation of reactants and transport of protons.

As known an electrolyzer is a device that generates hydrogen and oxygen from water through the application of electricity and includes a series of plates through which water flows while low voltage direct current is applied. Electrolyzers split the water into hydrogen and oxygen gases by the passage of electricity, normally by breaking down compounds into elements or simpler products.

Figure 3:
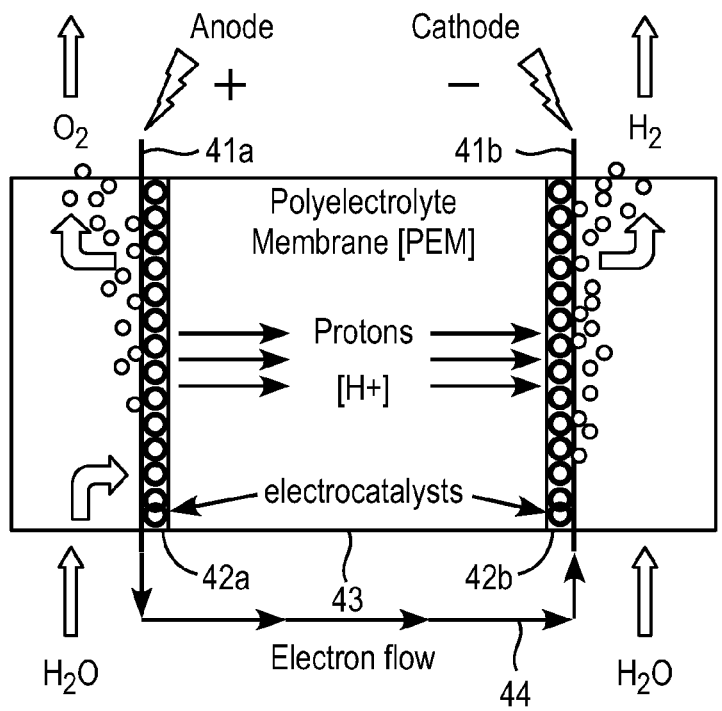
FIG. 3 is a diagram illustrating the operation and details of a PEM electrolyzer according to the present invention.

A PEM electrolyzer is shown in FIG. 3. The PEM electrolyzer includes a plurality of layers which are non-liquid including at least two external layers and an internal layer, including external electrodes 41 disposed opposite to each other one of which is the anode 41a and the other of which is the cathode 41b, electrocatalysts 42a and 42b disposed respectively on the anode 41a and the cathode 41b, and a membrane 43 disposed between the electrocatalysts 42a and 42b. The PEM electrolyzer further includes an external circuit 44 which applies electrical power to the anode 41a and the cathode 41b in a manner such that electrical power in the form of electrons flow from the anode 41a, along the external circuit 44, to the cathode 41b and protons are caused to flow through the membrane 43 from the anode 41a to the cathode 41b.

The efficiency of a PEM electrolyzer is a function primarily of its membrane and electro-catalyst performance. The membrane 43 includes a solid fluoropolymer which has been chemically altered in part to contain sulphonic acid groups, $SO_3H$, which easily release their hydrogen as positively-charged atoms or protons $H^+$: $SO_3H \rightarrow SO_3^- + H^+$ These ionic or charged forms allow water to penetrate into the membrane structure but not the product gases, namely molecular hydrogen $H_2$ and oxygen $O_2$. The resulting hydrated proton, $H_3O^+$, is free to move whereas the sulphonate ion $SO_3^-$ remains fixed to the polymer side-chain. Thus, when an electric field is applied across the membrane 43 the hydrated protons are attracted to the negatively charged electrode, known as the cathode 41b. Since a moving charge is identical with electric current, the membrane 43 acts as a conductor of electricity. It is said to be a protonic conductor.

A typical membrane material that is used is called "nafion". Nafion is a perfluorinated polymer that contains small proportions of sulfonic or carboxylic ionic functional groups.

Accordingly, as shown in FIG. 3, nonelectrolyte water, H2O, enters the electrolyzer 5 and is split at the surface of the membrane 43 to form protons, electrons and gaseous oxygen. The gaseous oxygen leaves the electrolyzer 5 while the protons move through the membrane 43 under the influence of the applied electric field and electrons move through the external circuit 44. The protons and electrons combine at the opposite surface, namely the negatively charged electrode, known as the cathode 41b, to form pure gaseous hydrogen.

During operation of the electrolyzer 5, a small amount of nonelectrolyte water 7 may be contained in hydrogen gas bubbles 22 and oxygen gas bubbles 23 as they emerge from the hydrogen outlet 12 and oxygen outlet 13, respectively, of the electrolyzer 5, and flow into the hydrogen side 18 and oxygen side 19 of the tank 6. The bubbles rise (travel) thru the nonelectrolyte water 7 to upper air cavities 24 formed by the water level in the tank and the tank divider 17. Since the hydrogen and oxygen may contain a small amount of nonelectrolyte water 7, the hydrogen and oxygen gases are passed back through the nonelectrolyte water tank 6 for water preservation so that said small amount of nonelectrolyte water 7 will remain in the nonelectrolyte water tank 6 rather than be retained in the gases. The hydrogen and oxygen gases are kept separate from each other in the upper cavities 24 by the divider 17 and water level in the tank 6. As the hydrogen gas and oxygen gas fill their respective upper cavities 24, the gas flows out of the upper cavities thru fittings 25 in the case of hydrogen, and fitting 26, in the case of oxygen on the upper side of the tank. The hydrogen gas flows thru tube 27 connected to hydrogen fitting 28 of the housing unit 2. The oxygen flows thru tube 29 connected to fitting 30 of the housing unit 2.

Figure 2:
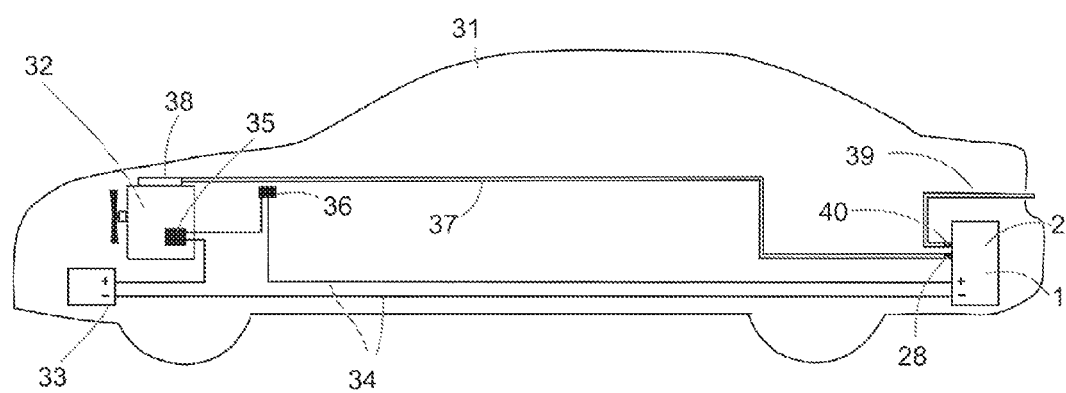
FIG. 2 is a schematic showing a portable hydrogen supplemental system installed in a typical vehicle according to the present invention.

As shown in FIG. 2, a vehicle 31 powered by a gasoline or diesel engine 32 is equipped with the portable hydrogen supplemental system 1. Power is supplied to the portable hydrogen supplemental system 1 by a vehicle battery 33 connected to electrical wires 34. The electrical circuit to the portable hydrogen supplemental system 1 includes a vacuum switch 35, or other engine sensor and an operator controlled switch 36 which completes the electrical circuit to the portable hydrogen supplemental system 1 when the engine is running. Once power is supplied to the portable hydrogen supplemental system 1, hydrogen gas flows thru hydrogen outlet tube 37 connected to hydrogen fitting 28 of the housing unit 2 to an air intake 38 of the vehicle's engine 32. Oxygen gas flows thru oxygen outlet tube 39 and, in the case of gasoline engines with oxygen sensors, is vented to the atmosphere. The two gasses can optionally be combined for diesel engine vehicles or other internal combustion engines without oxygen sensors.

Figure 4:
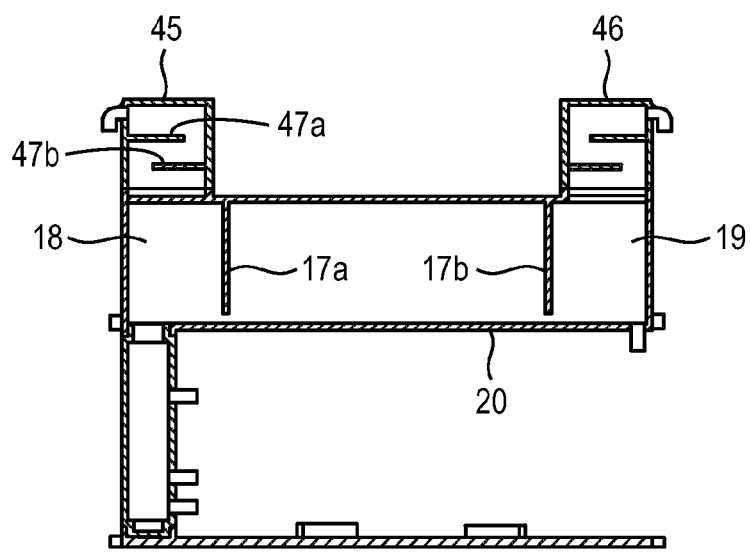
FIG. 4 is a diagram of another embodiment of the water tank 6 according to the present invention.

An alternative embodiment of the water tank 6 is illustrated in FIG. 4. As per the water tank 6 as shown in FIG. 4 dividers 17*a* and 17*b* are provided at opposite ends of the tank 6 so as to divide the tank 6 into a hydrogen section 18 and an oxygen section 19. Each divider 17*a,b* is formed along the inner wall of the tank 6 and extends to approximately ¼" from the bottom surface 20 of the tank 6. As nonelectrolyte water 7 is placed into the tank 6, the tank 6 fills evenly on both sides of each of the dividers 17*a* and 17*b*.

As described above according to the invention as the hydrogen gas and oxygen gas fill their respective upper cavities 24, the gas flows out of the upper cavities thru fitting 25 in the case of hydrogen, and fitting 26, in the case of oxygen on the upper side of the tank. Alternatively the fittings 25 and 26 can be replaced by gas collectors 45 and 46. Each gas collector 45, 46 is constructed to contain baffles 47*a* and 47*b* that serve to prevent water from splashing into or entering the tubes 27 and 29. Each baffle 47*a,b* is configured to extend perpendicularly from an inner surface of the gas collectors 45 and 46. Particularly, baffle 47*a* is configured to extend from a portion of the inner surface of a gas collector 45, 46 opposite to another portion of the inner surface of the gas collector 45, 46 from which baffle 47*b* extends.

Figure 5A:
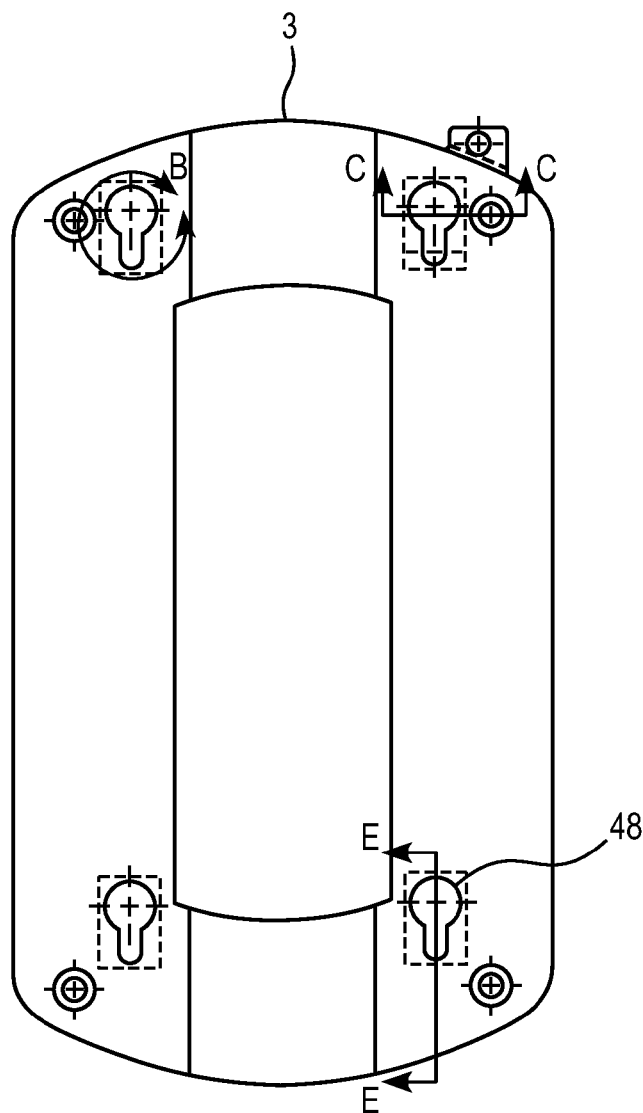
FIGS. 5A-B are diagrams of another embodiment of a mounting bracket 3 according to the present invention.
Figure 5B:
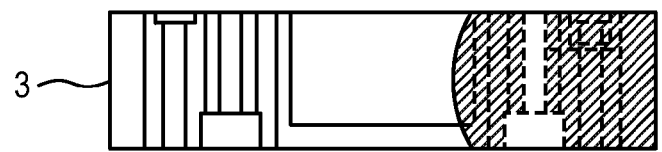

An alternative embodiment of the mounting bracket 3 is illustrated in FIGS. 5A-B. The mounting bracket 3 has formed therein oblong holes 48 positioned near the corners of the mounting bracket 3 for receiving screws/studs disposed on the undersigned of the housing unit 2. The oblong holes 48 upon receiving the screws/studs disposed on the undersigned of the housing unit 2 allows for the housing unit 2 to be removably attached to the mounting bracket 3. The housing unit 2 being removable from the mounting bracket 3 permits the user to remove the apparatus for servicing including adding water, performing repairs, exchanging parts, and the like.

Figure 6:
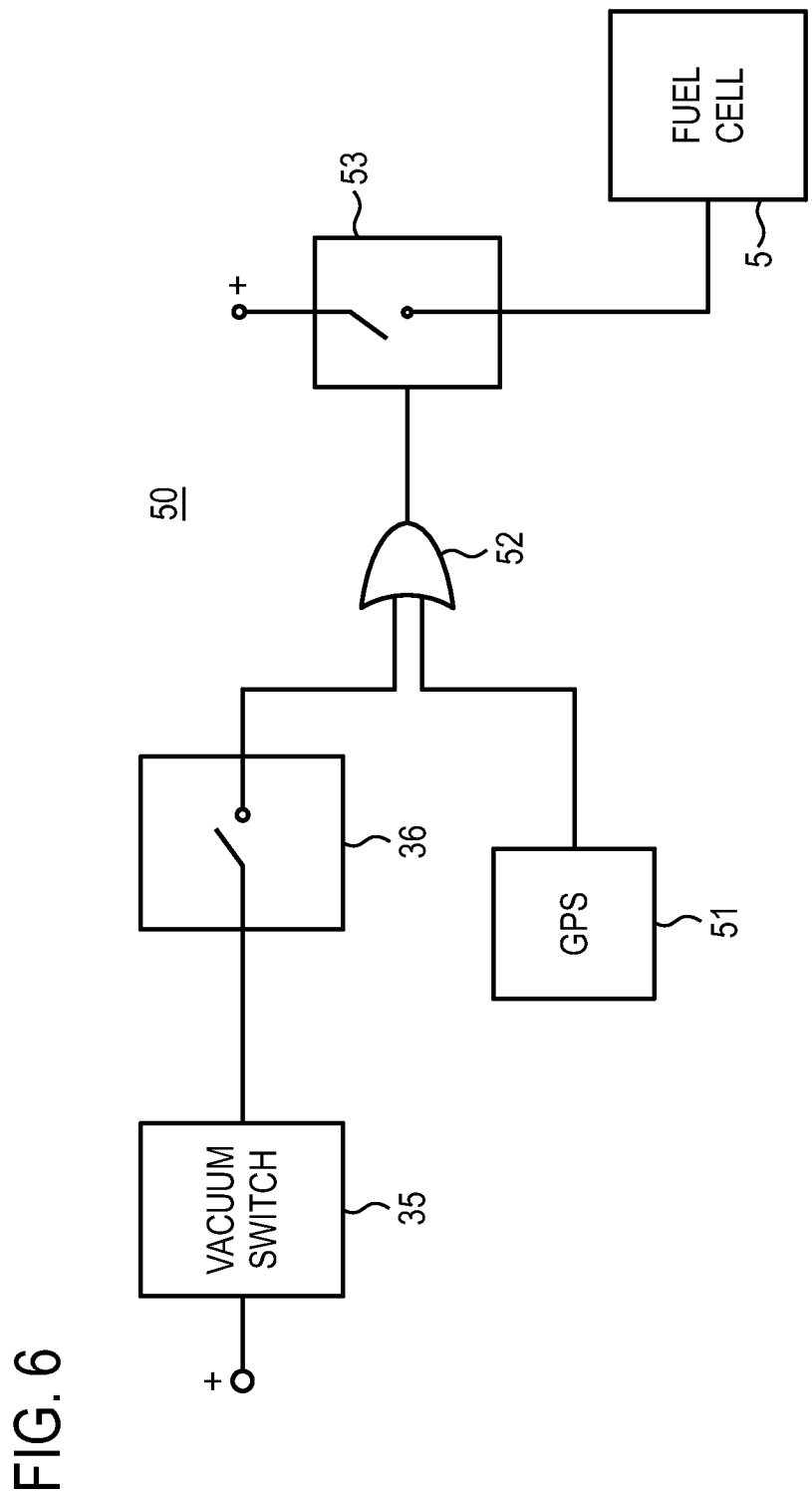
FIG. 6 is a diagram of an embodiment of the control circuit 50 according to the present invention.

The electrical circuit can, for example, be provided by a control circuit 50 as illustrated in FIG. 6 for controlling the portable hydrogen supplemental system 1. The control circuit 50 includes a vacuum switch 35, or other engine sensor, that provides a positive output when the engine is operating, an operator controlled switch 36 which provides the positive output from the vacuum switch 35 when the operator controlled switch 36 is moved to the on position, a global positioning system (GPS) 51 which provides a positive output when the speed of the automobile exceeds a predetermined level, AND gate 52, or other such circuitry, that provides a positive output when both the operator controlled switch 36 and the GPS 51 outputs are positive, and a switch 53 which switches electrical power to the electrolyzer 5 when the AND gate 52 supplies a positive output, thereby causing the electrolyzer 5 to operate when the engine is operating and the speed of the automobile exceeds a predetermined level.

The portable hydrogen supplemental system 1 operates optimally in a gasoline powered engine when the load on the engine does not exceed a predetermined level and the amount of hydrogen produced by the Hydrogen supplemental system and supplied to the gasoline powered engine falls within a preset range.

In a gasoline powered engine the electrical power used by the portable hydrogen supplemental system is supplied by the engine alternator. As described above the electrical power is only supplied when the engine is operating and the speed of the automobile exceeds a predetermined level. Thus, the load placed on the engine by the portable hydrogen supplemental system 1 is related to the amount of electrical power drawn from the alternator as measured in amps. Optimally the portable hydrogen supplemental system 1 works best on a gasoline powered engine when the load on the engine does not exceed a current of 4 amps being drawn from the alternator, or if measured another way of 56 watts. It should be noted that the amount of amps or watts is dependent upon the size of the engine and alternator (four, six or eight cylinders, etc.). It should also be noted that diesel engines have a different optimal load setting.

Further, in a gasoline powered engine the optimal amount of hydrogen produced by the portable hydrogen supplemental system 1 and supplied to the gasoline powered engine falls within a preset range of 0.10-0.25 liters per minute.

Based on the above a gasoline powered automobile achieves the highest level of fuel efficiency measured in miles/gallon of gas when the load on the engine does not exceed 4 amps, or if measured another way of 56 watts, and the amount of hydrogen produced and supplied to the gasoline powered engine falls within a preset range of 0.10-0.25 liters per minute.

While the invention has been described in terms of its preferred embodiments, it should be understood that numerous modifications may be made thereto without departing from the spirit and scope of the present invention. It is intended that all such modifications fall within the scope of the appended claims.

What is claimed is:

1. A portable hydrogen supplemental system for supplying hydrogen gas to an internal combustion engine comprising:
   a housing unit;
   a fuel cell mounted inside the housing unit that converts nonelectrolyte water into hydrogen and oxygen gas;
   a nonelectrolyte water tank mounted inside the housing unit and positioned to supply the nonelectrolyte water to the fuel cell;
   a power supply for supplying electrical power to the fuel cell;
   an engine sensor for detecting operation of the internal combustion engine and;
   an operator control switch,
   wherein the nonelectrolyte water tank includes at least one tank divider which separates the nonelectrolyte water tank into at least two sections that are both filled with nonelectrolyte water when the nonelectrolyte water is placed into the nonelectrolyte water tank;
   wherein the nonelectrolyte water tank includes at least first and second gas collection cavities at a top portion thereof for collecting hydrogen and oxygen gas respectively, the gas collection cavities being formed by a top surface of the nonelectrolyte water tank, the tank divider and the water level in the nonelectrolyte water tank;
   wherein each gas collection cavity includes a fitting at the top thereof for distributing one of the hydrogen and oxygen gas out of the nonelectrolyte water tank;

wherein the power supply supplies electrical power to the fuel cell when the engine sensor detects that the internal combustion engine is in operation and the operator control switch is activated;

wherein the fuel cell, when supplied with electrical power, produces hydrogen and oxygen gases from the nonelectrolyte water being supplied to the fuel cell, said hydrogen and oxygen gases being directed through the nonelectrolyte water tank into the gas collection cavities at the top thereof for proper distribution of the gases such that the hydrogen gas is supplied to the internal combustion engine for combustion therein;

wherein the nonelectrolyte water tank includes first and second dividers provided at opposite ends of the nonelectrolyte water tank to divide the nonelectrolyte water tank into a hydrogen section and an oxygen section; and wherein each divider is formed along an inner wall of the nonelectrolyte water tank and extends to a predetermined position from the bottom surface of the nonelectrolyte water tank such that when the nonelectrolyte water is placed into the nonelectrolyte water tank, the nonelectrolyte water tank fills evenly on both sides of each of the first and second dividers.

2. The system according to claim 1, wherein the fuel cell operates as an electrolyzer.

3. The system according to claim 2, wherein the electrolyzer is a proton exchange membrane.

4. The system according to claim 2, wherein the electrolyzer is a polymer electrolyte membrane.

5. The system according to claim 2, wherein the electrolyzer comprises a plurality of layers which are non-liquid including at least two external layers and an internal layer, including external electrodes disposed opposite to each other, wherein one external electrode comprises an anode and the other external electrode comprises a cathode.

6. The system according to claim 5, wherein electrocatalysts are disposed respectively on the anode and the cathode, and a membrane is disposed between the electrocatalysts, an external circuit applies electrical power to the anode and the cathode in a form of electrons flowing from the anode along the external circuit and to the cathode, and protons are caused to flow through the membrane from the anode to the cathode.

7. The system according to claim 1, wherein when the internal combustion engine is a gasoline powered engine, and a load of the engine does not exceed a predetermined level, an amount of the hydrogen gas within a preset range is produced by the system and supplied to the gasoline powered engine.

8. The system according to claim 7, wherein the preset range comprises approximately 0.10 liters to approximately 0.25 liters per minute.

9. The system according to claim 8, wherein the load does not exceed a current of approximately 4 amps or 56 watts.

10. The system according to claim 7, wherein the load amount is dependent upon a size of the gasoline powered engine.

* * * * *